3,000,805
ELECTRODE MEASURING DEVICE
Dayton E. Carritt, 635 Colorado Ave., Baltimore, Md., and John W. Kanwisher, Box 234, Woods Hole, Mass., assignors of twenty percent to Walter G. Finch, Baltimore, Md.
Filed Aug. 30, 1957, Ser. No. 681,292
12 Claims. (Cl. 204—195)

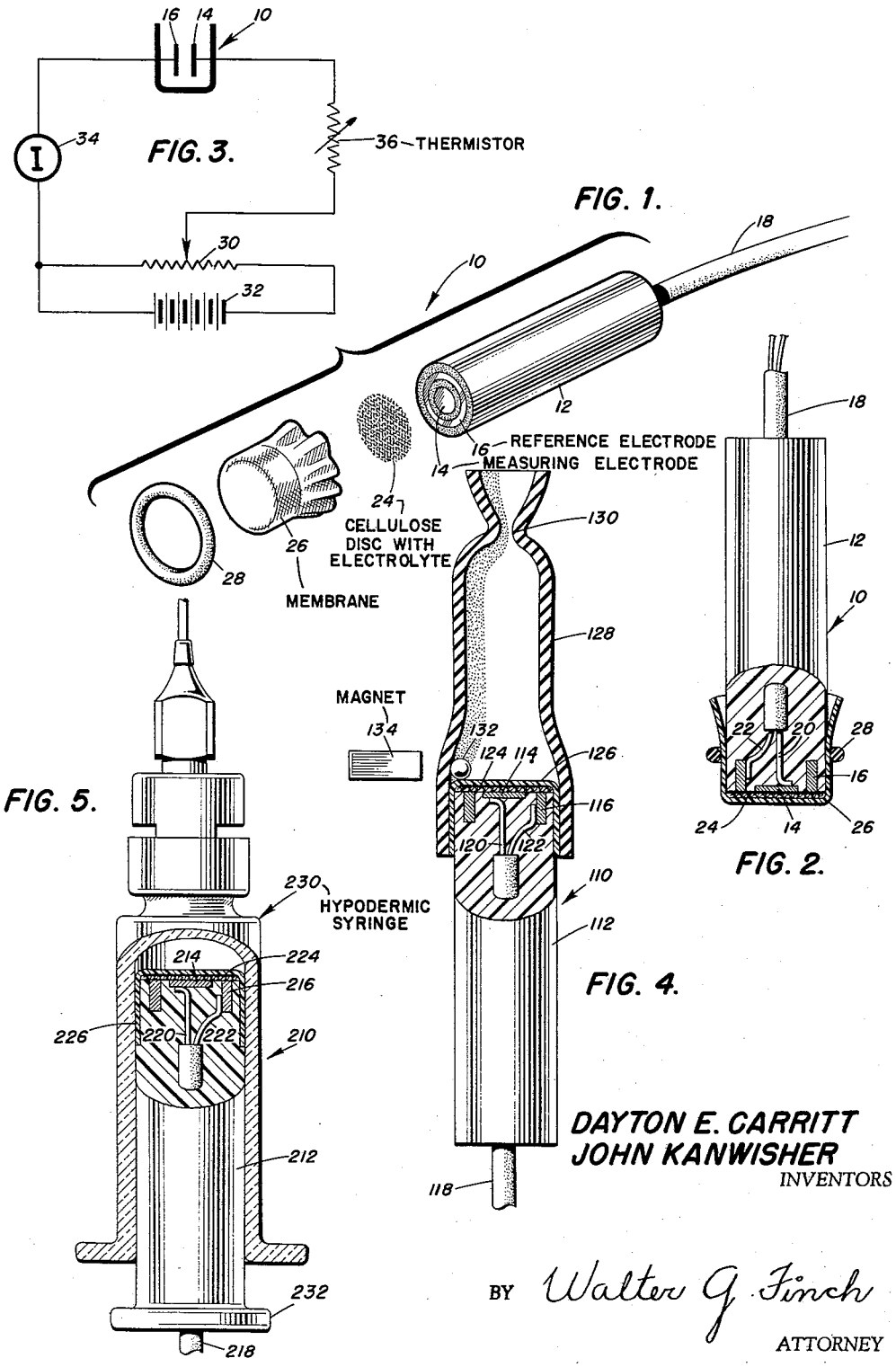

This invention relates generally to measuring instruments of the electrochemical variety, and particularly to an electrolytic cell device which can be used to determine the concentration of reducible gas in gaseous mixtures as well as the content of dissolved reducible gas in aqueous solutions.

Although this invention is illustrated in conjunction with determination of oxygen concentrations, it is to be understood that the invention is not limited thereto, as it is readily applicable to measurement of other, less common, reducible gases, as will become obvious to those skilled in the art.

Even the best current methods of determining reducible oxygen levels are not entirely satisfactory in many critical industrial and scientific applications, because they are relatively insensitive and inaccurate, or are complex and expensive. Few are adaptable to continuous, automatic measurement and display, and not easily portable. Finally, it will be found that many of the presently established methods and apparatus give results strongly biased by varying concentrations of irrelevant substances in solutions under test.

It is one of the objects of this invention, therefore, to provide a measuring device which will accurately determine oxygen levels in sample gaseous mixtures and aqueous solutions despite frequent, large changes in oxygen concentration in the samples.

Another object of this invention is to provide a measuring device which is sensitive, self-contained, compact, and convenient to operate, and which gives quick and reliable results.

And still another object of this invention is to provide a device which contacts the sample or test fluid only through an inert membranous sheath, to the end that contamination of the test fluid by the measuring device be kept to a minimum.

And still another object of this invention is to provide a measuring device capable of withdrawing a quantity of fluid from a body, and measuring its oxygen content, all without exposure of the fluid to the air, or other source of external contamination.

Even still another object of this invention is to provide a measuring device capable of continuously monitoring the level of dissolved oxygen in a fluid, such as industrial process feed water, and capable of actuating recording and control devices automatically in response to fluctuations in the oxygen level.

And another object of this invention is to provide a measuring device which responds only to dissolved reducible gases, and which is practically unaffected by the presence of easily reducible ions, in testing aqueous solutions.

And still another object of this invention is to provide a measuring device of the electrolytic cell type which is economical to manufacture, efficient and reliable in operation, and easy to maintain.

And still another object of this invention is to provide a means and method for producing a reference electrode prior to the use of the device in testing solutions or gas mixtures, such that the reference electrode is of a similar chemical composition to that which would be produced by reaction of the reference electrode metal with the reduction products formed at the platinum electrode during normal operation of the device. The preformation of the reference electrode is essential to the accurate and precise operation of the device during the initial period of use thereof.

These and other objects and advantages of this invention will become more readily understood from the accompanying specification and drawings in which:

FIG. 1 is an exploded perspective of the basic invention;

FIG. 2 is an elevation of the device disclosed in FIG. 1 with all parts in assembled relation, and with one end thereof shown in section;

FIG. 3 is a schematic of the circuitry for this invention;

FIG. 4 is a section through a modified form of the invention in which a calibrated chamber is provided for the solution to be tested, complete with magnetic stirring device;

FIG. 5 is a section through a further modification of the invention in which it is incorporated in a hypodermic syringe to facilitate analysis of blood and other fluids.

It will be seen that, in accordance with the objects of this invention, there is provided a compact and conveniently operated instrument for measuring the concentration of oxygen in gaseous mixtures, and of that dissolved in aqueous and other solutions.

The basic embodiment of this invention is shown in FIGS. 1, 2 and 3 and it comprises an electrolytic cell consisting of a pair of spaced coaxial electrodes supported by, and at, one end of a rigid dielectric cylinder and bathed in an electrolytic solution from a saturated paper disc which is pressed against the exposed coplanar surfaces of electrodes by a cap-shaped membranous sheath fitted closely over the end of the dielectric cylinder and retained by an elastic ring.

The paired electrodes are interconnected through electric leads, a battery and an ammeter in such manner that an electric potential is impressed between the pair of electrodes so that any resultant current flow can be read.

In operation, the sample fluid, whose oxygen content is to be gauged, is brought into contact with the sheathed end of the instrument. Molecular oxygen from the sample fluid permeates the membranous sheath and electrolyte and is reduced at one of the electrodes, which is of platinum, in accordance with principles familiar to those skilled in the art. The resultant current flow in the device is to be construed as being proportional to oxygen concentration in the sample solution, under the operating conditions of the cell.

Referring now in particular to FIGS. 1 and 2, there is illustrated a probe 10, consisting of a cylindrical electrode block 12 made of rigid dielectric material such as Lucite, or epoxy resin, partially embedded in one of its ends, a disc shaped platinum reaction electrode 14 surrounded at a suitable distance by a ring shaped reference electrode 16 made of silver. Platinum is chosen for the reaction electrode as the material best suited to promote electrochemical reduction of molecular oxygen, under operating conditions of the device.

The exposed (unembedded) faces of the electrodes 14 and 16 lie in the same place, and are contiguous with a disc of cellulose paper 24, which is saturated with a suitable electrolyte, such as potassium chloride. The composition of the electrolyte must be such that a constant reference potential is maintained in the cell in conjunction with said silver electrode; that there is electrolytic conduction between the reference and reaction electrodes 16 and 14; and there is ready transfer of molecular oxygen through said electrolyte. Solutions of KCl, KOH, or other alkaline or halide substances, or mixtures of these, satisfy these requirements. Solutions of KCl satisfy temporary requirements of stability. However, because of utilization of chloride at the reference electrode its potential will drift with time, whereas use of KOH provides for infinite stability. The concentration of the alkaline electrolyte remains constant because of the electrochemical equivalence of the regeneration of the hydroxyl ion at the platinum electrode and utilization at the silver electrode.

The cellulose paper disc 24, which is pressed against the electrodes 14 and 16 as described above, serves as an internal diffusion barrier and anti-polarization sheet by reacting with products formed by cell action, which might otherwise cause erratic operation or failure of the cell, and by controlling distribution of molecular oxygen to the reaction electrode. For example, the disc 24 reacts with the hydrogen peroxide formed to remove it from solution.

Pressing cellulose paper disc 24 against the electrodes 14 and 16 and containing the electrolyte against loss, is a gas permeable membranous sheath 26, of polyethylene. This sheath 26 is held in cap-form over the end of the cylindrical electrode block by an elastic O ring 28. Polyethylene is chosen for the gas permeable membrane because of its relative stability, although other common plastics are suitable in varying degree.

A two-lead electric cable 18 passes through the interior length of the cylindrical electrode block 12 and through one lead 20, connects reaction electrode 14 with the adjustable tap of a potentiometer 30 which is maintained at a minus potential of about 0.9 volt by a battery 32, both illustrated in FIG. 3.

The other lead 22 of the cable 18 connects electrode 16, through an ammeter 34, as seen in FIG. 3, to the positive side of the simple potentiometer circuit comprising a potentiometer 30 and a battery 32.

The reference electrode 16, which is composed of silver or any other suitable metal, is preformed before assembly of the internal diffusion barrier and the gas permeable membranous sheath 26 by impressing a suitable voltage across the two electrodes 14 and 16 and by immersing the electrodes into a solution of chemical composition such that the reference electrode becomes coated with a film of oxide, chloride hydroxide or a mixture of two or more of the compounds named. If the reference electrode 16 is not pretreated the first fifteen minutes to a half hour of operation, a slow drift up to the correct value of current is obtained. The pretreatment of the electrode 16, therefore, performs the same function as the first half hour of operation of the cell 10.

Proper adjustment of the potentiometer circuit consists in applying a voltage such that after all reducible material at the reaction electrode is exhausted, no further current flows through the electrolyte, which, however, remains polarized. When this equilibrium is reached, the device is ready to be used in measurement.

Current flow at a constant oxygen level in a sample fluid is proportional to effective surface area of the platinum electrode, and inversely proportional to thickness of the polyethylene membrane 26. At the same time, the current flow is strongly temperature dependent, and it is important that the results be calibrated against temperature, or that automatic temperature compensation be provided by a thermistor 36, as shown in FIG. 3 or other temperature sensitive resistance used with the electrode in such a way that the thermistor assumes the temperature of the liquid or gas being tested. When the thermistor 36 is connected in series with the electrolytic cell 10, the voltage drop across it will be a measure only of the oxygen concentration in the solution or gas being tested. The thermistor 36 has an equal but opposite temperature coefficient to an uncompensated cell. This thermistor 36 is brought to the same temperature as the solution whose oxygen content is being measured.

In FIG. 4, there is illustrated an accessory device, comprising a length of Tigon, or other tubing, fitted over the sheathed end of a probe 110 in such manner as to form a cup of known volume or calibrated cup 128. In use, the cup is filled with fluid to be tested, which may be agitated by a metal ball 132 manipulated by means of a hand-held magnet 134. The reduced cup neck 130 usefully restricts gas exchange during measurement of the oxygen content.

In the embodiment of the invention of FIG. 4, the probe is identical with that of FIG. 2, the parts numbered 110, 112, 114, 116, 118, 120, 122, 124 and 126 being the same as those numbered 10, 12, 14, 16, 18, 20, 22 and 26, respectively, in FIG. 2, except that the function of O ring 28 in FIG. 2 is performed by the tubing 128 in FIG. 4.

An embodiment of a device of obvious value in medical and biological determinations, is shown in FIG. 5, in which a probe 210, substantially the same as probe 10 of FIG. 2, serves as a plunger in a hypodermic syringe assembly 230 to the end that fluid samples may be withdrawn, and assayed for oxygen content, without exposure to air or other external contaminant.

Again in FIG. 5 parts numbered 210, 212, 214, 216, 218, 220, 222, 224 and 226 are similar to those numbered 10, 12, 14, 16, 18, 20, 22, 24 and 26, respectively, in FIG. 2, except that two modifications of the cylindrical electrode block 212 are useful, as indicated in FIG. 5. First, one end of the block 212 is fitted with a flanged finger pull 232. Second, the opposite end of said cylindrical electrode block 212 is relieved so that the cylindrical surface of cap shaped membranous sheath 226 may be cemented in place flush with the cylindrical outer surface of the block 212.

Obviously, many other modifications and variations of the present invention are possible in the light of the above teachings. It is, therefore, to be understood that within the scope of the appended claims the invention may be practiced otherwise than as specifically described.

What is claimed is:

1. A device for determining the content of dissolved reducible gas in a solution composed of at least one reducible gas in a liquid, comprising, electrolytic cell means including a pair of spaced electrodes, one of said spaced electrodes being a reference electrode and the other a measuring electrode, an alkaline electrolyte bridging said spaced electrodes, said electrolyte having a constituent identical with the substance formed at the measuring electrode and consumed in chemically equivalent quantity at the reference electrode of said spaced electrodes, a membrane for encasing said spaced electrodes and said electrolyte and for separating from solution said dissolved reducible gas in said solution from said dissolved salts in the same solution, said membrane being gas permeable to said dissolved reducible gas in said solution but non-permeable to said dissolved salts in said solution, and an electric circuit including a source of potential for said spaced electrodes and a temperature compensating device electrically associated with said electrolytic cell means for abetting and detecting an electrical change in said electrolytic cell means resulting from the reduction of the dissolved reducible gas which passes through said membrane into said electrolytic cell means, with said temperature compensating device compensating for changes in temperature in the environment of said membrane.

2. A device for determining the content of dissolved reducible gas in a solution composed of at least one reducible gas in a liquid, comprising, electrolytic cell means including a pair of spaced electrodes having an alkaline electrolyte bridging said spaced electrodes, said spaced electrodes and electrolyte being encased in a membrane for the separation of said dissolved reducible gas in said solution from dissolved salts in the same solution, said membrane being gas permeable to said dissolved gas in said solution but non-permeable to said dissolved salts in said solution, and an electric circuit including a source of potential for said spaced electrodes and a temperature compensating device electrically associated with said electrolytic cell means for abetting and detecting an electrical change in said electrolytic cell means resulting from the reduction of the dissolved reducible gas which passes through said membrane into said electrolytic cell means, with said temperature compensating device compensating for changes in temperature in the environment of said membrane.

3. A device for determining the content of dissolved reducible gas in a solution composed of at least one reducible gas in a liquid, comprising, electrolytic cell means including a pair of spaced electrodes, one of said spaced electrodes being a reference electrode and the other a measuring electrode, an alkaline electrolyte bridging said electrodes, said electrolyte having a constituent identical with the substance formed at the measuring electrode and consumed in chemically equivalent quantity at the reference electrode of said spaced electrodes, a membrane for encasing said spaced electrodes and electrolyte, said membrane being gas permeable to said dissolved reducible gas in said solution but non-permeable to said dissolved salts in said solution, and an electric circuit including a potential source for said spaced electrodes and electrically associated with said electrolytic cell means for abetting and detecting an electrical change in said electrolytic cell means resulting from the reduction of the dissolved reducible gas which passes through said membrane into said electrolytic cell means.

4. A device for measuring the amount of dissolved reducible gas in a solution having at least one reducible gas in a liquid, comprising, electrolytic cell means including spaced electrodes, one of said spaced electrodes being a reference electrode and the other a measuring electrode, an alkaline electrolyte bridging said spaced electrodes, said electrolyte having a constituent identical with the substance formed at the measuring electrode and consumed in chemically equivalent quantity at the reference electrode of said spaced electrodes, means including a dielectric support for said electrodes, means including a plastic membrane supported by said dielectric support for separating from solution said dissolved reducible gas in said solution from dissolved salts in the same solution, said membrane being gas permeable to said dissolved reducible gas in said solution but non-permeable to said dissolved salts in said solution, and an electric circuit including a source of potential for said spaced electrodes and a temperature compensating device electrically connected to said spaced electrodes to promote the reduction of said dissolved reducible gas passing through said membrane when said measuring device is introduced into said solution and to measure the current flow resulting from the reduction of said dissolved reducible gas in said solution from dissolved salts in the same solution, with said temperature compensating device compensating for changes in temperatures in the environment of said membrane.

5. A device for measuring the amount of dissolved reducible gas in a solution having at least one reducible gas in a liquid, comprising, electrolytic cell means including spaced electrodes, one of said spaced electrodes being a reference electrode and the other a measuring electrode, an alkaline electrolyte bridging said spaced electrodes, said electrolyte having a constituent identical with the substance formed at the measuring electrode and consumed in chemically equivalent quantity at the reference electrode of said spaced electrodes, means including a dielectric support for said spaced electrodes, a plastic membrane supported by said dielectric support for separating from solution said dissolved reducible gas in said solution from dissolved salts in the same solution, said membrane being gas permeable to said dissolved reducible gas in said solution but non-permeable to said dissolved salts in said solution, and an electric circuit including a source of potential connected to said spaced electrodes to promote the reduction of said dissolved reducible gas passing through said membrane when said device is introduced into said solution and to measure the electrical current flow resulting from the reduction of said dissolved reducible gas.

6. A device for measuring the amount of dissolved reducible gas in a solution having at least one reducible gas in a liquid, comprising, electrolytic cell means including at least two spaced electrodes, one of said spaced electrodes being a reference electrode and the other a measuring electrode, an alkaline electrolyte bridging said spaced electrodes, said electrolyte having a constituent identical with the substance formed at the measuring electrode and consumed in chemically equivalent quantity at the reference electrode of said spaced electrodes, means including a dielectric support for said spaced electrodes, means including a plastic membrane supported by said dielectric support for separating from solution said dissolved reducible gas in said solution from dissolved salts in the same solution, said membrane being gas permeable to said dissolved reducible gas in said solution but non-permeable to said dissolved salts in said solution, and an electric circuit including a source of electrical potential for said spaced electrodes and a temperature compensating device electrically connected to said spaced electrodes to promote the reduction of said dissolved reducible gas passing through said membrane when said measuring device is introduced into said solution and to measure the electrical current flow resulting from the reduction of said dissolved reducible gas, with said temperature compensating device compensating for changes in temperature in the environment of said membrane.

7. A gas measuring device for determining the content of dissolved reducible gas in a solution consisting of at least one reducible gas in a liquid, comprising, means including an insulating support and spaced platinum cathode and silver anode electrodes supported thereby having an alkaline electrolyte bridging said spaced electrodes, said electrolyte having a constituent identical with the substance formed at said platinum cathode and consumed in chemical equivalent quantity at said silver anode electrode of said spaced electrodes, means including a plastic membrane sheath enclosing said spaced electrodes and electrolyte for the separation of said dissolved reducible gas in said solution, said membrane sheath being gas permeable to said dissolved reducible gas in said solution but non-permeable to said dissolved salts in said solution, means including a cellulose layer saturated in said electrolyte for electrically connecting said spaced electrodes together, and an electrical circuit including a temperature compensating device, a souce of potential for said spaced electrodes, and a measuring device electrically associated with said electrical circuit for promoting and detecting electric changes consequent to the presence of said dissolved reducible gas which passes through said membrane sheath from said solution to said platinum cathode electrode as a measure of gas content, said temperature compensating device compensating for changes in temperature in the environment of said membrane sheath.

8. A gas measuring device for determining the content of dissolved reducible gas in a solution consisting of at least one reducible gas in a liquid, comprising, means including an insulating support and a pair of spaced electrodes supported thereby, one of said spaced electrodes being a reference electrode and the other a measuring electrode, an alkaline electrolyte bridging said spaced electrodes, said electrolyte having a constituent identical with the substance formed at the measuring electrode and consumed in chemically equivalent quantity at the reference electrode of said spaced electrodes, plastic membrane means spaced from and enclosing said pair of spaced electrodes and electrolyte for the separation from solution of said dissolved reducible gas in said solution from dissolved salts in the same solution, said membrane means being gas permeable to said dissolved reducible gas in said solution but non-permeable to said dissolved salts in said solution, means supported by said insulating support and extending outwardly from said membrane means for receiving a sample of said solution to be analyzed and for positioning said solution adjacent said membrane means, and an electrical circuit including a source of potential for said spaced electrodes and a temperature compensating device electrically connected to said spaced electrodes to promote reduction of said dissolved reducible gas passing through said membrane means to said spaced electrodes and to measure electrical current flow resulting therefrom, with said temperature compensating device compensating for changes in temperature in the environment of said membrane means.

9. A gas measuring device as recited in claim 8, and magnetic means mechanically associated with said sample of said solution for agitating the same.

10. A gas measuring device for medical and biological determinations of oxygen content in a liquid solution, comprising, means including an insulating support and a pair of spaced electrodes supported thereby, one of said spaced electrodes being a reference electrode and the other a measuring electrode, an alkaline electrolyte bridging said pair of spaced electrodes, said electrolyte having a constituent identical with the substance formed at the measuring electrode of said pair of spaced electrodes and consumed in chemically equivalent quantity at the reference electrode of said pair of spaced electrodes, plastic membrane means spaced from and enclosing said pair of spaced electrodes and electrolyte for the separation of said oxygen in said liquid solution from dissolved salts in the same solution, said membrane means being gas permeable to said dissolved oxygen in said solution but non-permeable to said dissolved salts in said solution, means including a hypodermic syringe assembly for obtaining a sample of said solution to be analyzed for oxygen content by drawing said sample of said solution into contact with said plastic membrane means, and an electrical circuit including a source of potential for said pair of spaced electrodes and a temperature compensating device connected to said spaced electrodes to promote reduction of said oxygen and to measure electrical current flow which is a function of the oxygen content in said solution, said temperature compensating device compensating for temperature changes in the environment of said plastic membrane means.

11. A temperature compensated device for determining the content of dissolved reducible gas in a solution composed of at least one reducible gas in a liquid, comprising, electrolytic cell means including a pair of spaced electrodes, one of said pair of spaced electrodes being a reference electrode and the other a measuring electrode, an alkaline electrolyte bridging said spaced electrodes, said electrolyte having a constituent identical with the substance formed at the measuring electrode and consumed in chemically equivalent quantity at the reference electrode of said pair of spaced electrodes, a plastic membrane for encasing said spaced electrodes and electrolyte for the separation of said dissolved reducible gas in said solution from dissolved salts in the same solution, said membrane being gas permeable to said dissolved reducible gas in said solution but non-permeable to said dissolved salts in said solution, and a temperature compensating electric circuit including a source of potential for said pair of spaced electrodes electrically associated with said electrolytic cell means for abetting and detecting an electrical change in said electrolytic cell means resulting from the reduction of the dissolved reducible gas which passes through said membrane into said electrolytic cell means.

12. A temperature compensated device for determining the content of dissolved reducible gas in a solution composed of at least one reducible gas in a liquid, comprising, electrolytic cell means including a pair of spaced electrodes having an alkaline electrolyte bridging said spaced electrodes, said electrolyte having a constituent identical with the substance formed at one of said spaced electrodes and consumed in chemically equivalent quantity at said other electrode of said pair of spaced electrodes, said spaced electrodes being encased in a plastic membrane for the separation of said dissolved reducible gas in said solution from dissolved salts in the same solution, said membrane being gas permeable to said dissolved reducible gas in said solution but non-permeable to said dissolved salts in said solution, and a temperature compensating electric circuit associated with said electrolytic cell means for abetting and detecting an electrical change in said electrolytic cell means resulting from the reduction of the dissolved reducible gas which passes through said membrane into said electrolytic cell means.

References Cited in the file of this patent

UNITED STATES PATENTS

| 1,601,383 | Todd | Sept. 28, 1926 |
| 2,278,248 | Darrah | Mar. 31, 1942 |
| 2,624,701 | Austin | Jan. 6, 1953 |
| 2,651,612 | Haller | Sept. 8, 1953 |
| 2,732,335 | Glass | Jan. 24, 1956 |
| 2,745,803 | Leveque | May 15, 1956 |
| 2,745,804 | Shaffer | May 15, 1956 |
| 2,760,922 | Williams | Aug. 28, 1956 |
| 2,787,903 | Beard | Apr. 9, 1957 |
| 2,913,386 | Clark | Nov. 17, 1959 |

OTHER REFERENCES

Industrial and Eng. Chem., Separation of Gases by Plastic Membranes, vol. 46, No. 4, pp. 733–742.

Tech. Info. Service, Oak Ridge, Tennessee, May 27, 1952, pp. 2 and 21, article by Busch et al. Applications of the Dropping Mercury Electrode to B.O.D. Determinations.